United States Patent [19]

Sacane

[11] Patent Number: 4,791,777
[45] Date of Patent: Dec. 20, 1988

[54] LEG NETS

[76] Inventor: Elise J. Sacane, 1506 Powell La., Redlands, Calif. 92373

[21] Appl. No.: 916,759

[22] Filed: Oct. 8, 1986

[51] Int. Cl.$^4$ .................................................. B68C 5/00
[52] U.S. Cl. ................................................................ 54/81
[58] Field of Search ........................ 54/79, 80, 81, 82; 119/143; 2/22, 240, 242

[56] References Cited

U.S. PATENT DOCUMENTS

| | | |
|---|---|---|
| 216,133 | 6/1879 | Ayres . |
| 285,026 | 9/1883 | Gingras . |
| 359,937 | 3/1887 | Nordyke . |
| 438,105 | 10/1890 | Geyer ................................. 54/82 X |
| 612,633 | 10/1898 | Sandford . |
| 1,218,829 | 3/1917 | Bean ........................................ 54/81 |
| 1,608,453 | 11/1926 | Witcuffsk . |
| 2,125,451 | 8/1938 | Kolliner ............................. 2/242 X |
| 2,246,100 | 6/1941 | Marzani ................................. 54/82 |
| 2,449,410 | 9/1948 | Polinsky ................................. 54/82 |
| 3,753,334 | 8/1973 | Blessing ................................. 54/80 |
| 4,305,243 | 12/1981 | Yu ............................................ 54/81 |
| 4,404,789 | 9/1983 | Denning ................................. 54/80 |
| 4,448,429 | 11/1984 | Knox ....................................... 54/80 |
| 4,519,187 | 5/1985 | Reynolds ................................. 54/81 |
| 4,662,156 | 5/1987 | Oettel ...................................... 54/80 |

FOREIGN PATENT DOCUMENTS 2404428  6/1979  France ...................................... 54/82

Primary Examiner—Robert P. Swiatek
Attorney, Agent, or Firm—Jones, Tullar & Cooper

[57] ABSTRACT

A leg net assembly for use in keeping biting insects and dirt away from lower leg portions of horses is disclosed. Each leg net includes a central mesh or net body portion which is provided with upper and lower knit supporting and retaining members. The mesh or net body portion is bloused or ballooned so that it stands off the animal's leg and allows for fresh air circulation. Any biting insects landing on the body of the leg net assembly cannot contact the animal's skin.

1 Claim, 1 Drawing Sheet

U.S. Patent  Dec. 20, 1988  4,791,777
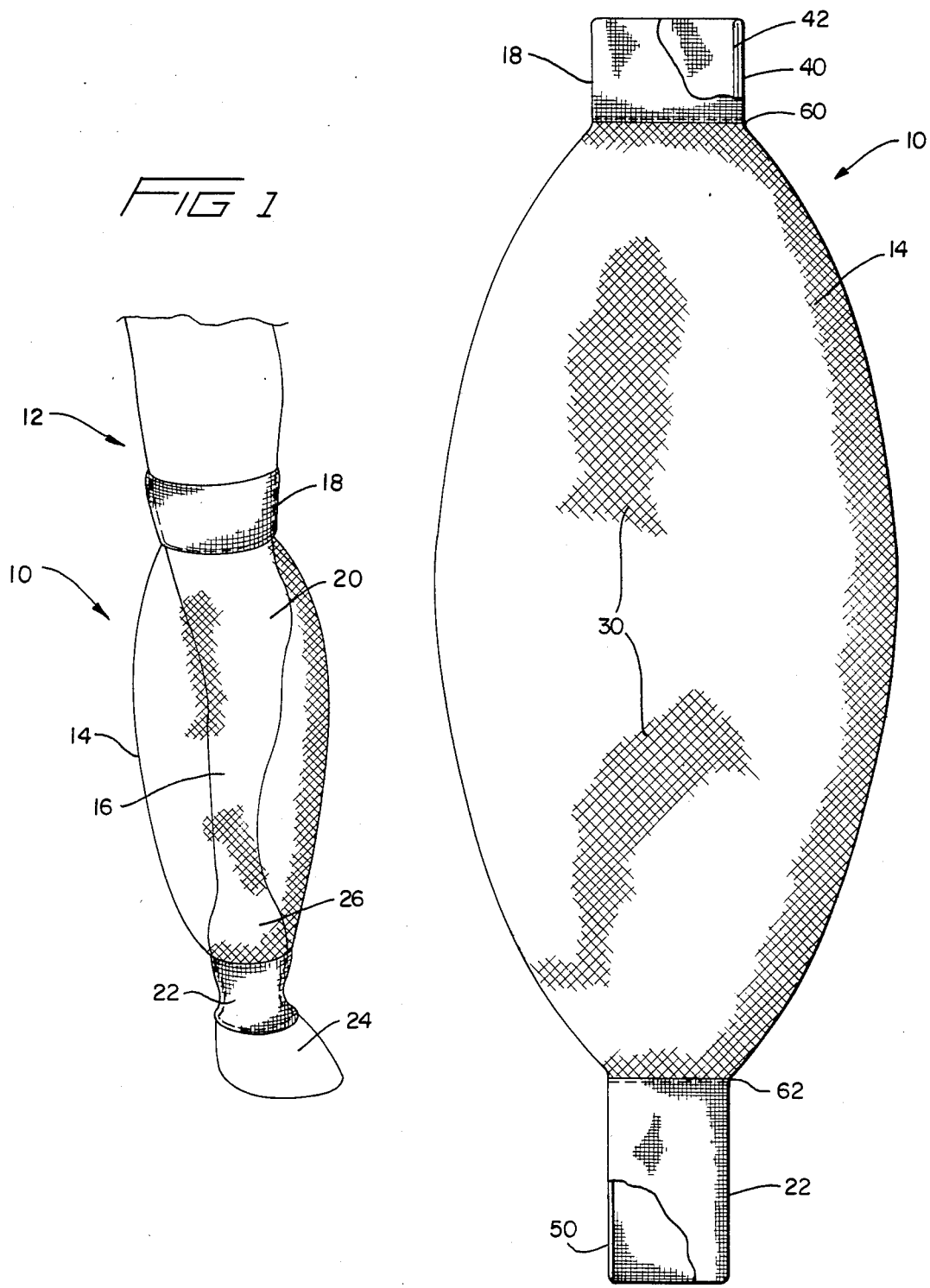

_4,791,777_

LEG NETS

FIELD OF THE INVENTION

The present invention is directed generally to a mesh covering to be worn by an animal. More particularly, the present invention is directed to an insect excluding net or mesh covering placeable about the leg of an animal such as a horse. Most specifically, the present invention is directed to an insect excluding leg net or sleeve for placement about the lower leg of a horse. The leg net is structured utilizing a generally cylindrical, light weight synthetic netting having a small mesh size. This sleeve has a somewhat bloused or balloon shape and is provided at its upper end with a knit nylon cuff and at its lower end with a knit nylon sock. These knit nylon support members of the leg net assembly provide ample support for the central mesh sleeve section and retain it in place on the leg of the animal yet do not hinder the animal's movement or cause any aggravation to the animal. The leg nets are effective in preventing biting insects from bothering the lower leg of a horse or other animal and in keeping dirt and debris off the leg.

DESCRIPTION OF THE PRIOR ART

Various domesticated animals generally, and horses in particular, are bothered by flies and other biting insects. These insects light on the horse and either cause festering sores or enlarge and aggravate previously existing wounds and cuts. Insect bites can both endanger the physical well being of the animal and can also cause the horse to become nervous and irritable. The problem is particularly severe in situations where the horse is confined to a stall or to a small paddock area.

A horse's normal defense against flies and other biting insects is either tail swishing or muscle twitching. The lower leg areas of a horse are most vulnerable to attack by biting insects since the coat is thin, the blood vessels are close to the surface, and the muscle coverage is not great. Because tail swishing and muscle twitching are not particularly effective ways to dislodge flies and other biting insects which light on the horse's lower leg, the horse is apt to resort to foot stomping or nervous pacing. Such actions can lead to problems which affect the soundness of the hoof and leg. Further, such foot stomping and pacing are also disruptive to adjacent animals as well as causing the horse to be irritable and nervous.

Many horse owners presently use large quantities of insecticides or resort to various leg wraps to alleviate the problem of biting insect discomfort. Both of these procedures are undesirable for several reasons. Both cause the horse to sweat. Furthermore, they may both lead to secondary problems such as insecticide intolerance or overdose or sores from the leg taping. In either instance, the biting insect problem is replaced by one or more other equally undesirable problems.

Various prior art patents disclose numerous covers and protective devices for horses. Exemplary of these are the following:

| Patents | Inventors |
|---|---|
| 216,133 | Ayres |
| 285,026 | Gingras |
| 359,937 | Nordyke |
| 438,105 | Geyer |
| 612,633 | Sandford |
| 1,218,829 | Bean |
| 1,608,453 | Witcuffsk |
| 2,246,100 | Marzani |
| 2,449,410 | Polinsky |
| 3,753,334 | Blessing |
| 4,305,243 | Yu |
| 4,404,789 | Denning |
| 4,480,429 | Knox |
| 4,519,187 | Reynolds |

Various ones of these patents show leggings and covers for various areas of a horse's body. Others show fringe devices and the like that are essentially substitutes for, or adjuncts to the horse's swishing tail. A number of the coverings are somewhat cumbersome and are not easily applied or removed. In addition, they cause the horse some discomfort and are apt to make the animal nervous or irritable. The various fringes, tassels, and the like require the animal to move and thus reinforce the foot stomping or nervous pacing behaviors that are also disruptive of the stall or paddock area.

When a horse has cut or abraded is lower leg area, it is desirable to allow the circulation of fresh air to aid healing. However, leaving the wound open and uncovered merely encourages flies and other biting animals as well as leaving the area open to dust, dirt, debris and other possible stable area contaminants. The use of prior art bandages and tight wraps to protect the wound prevents adequate air circulation thereby encouraging wound festering and preventing fast healing.

It will thus be seen that a need exists for a leg covering and protective device which will effectively keep flies and other biting insects away from horses legs, which will allow unrestricted air flow, and which will be simple and inexpensive. The leg nets in accordance with the present invention provide such a leg protective device.

SUMMARY OF THE INVENTION

It is an object of the present invention to provide a leg net for the leg of an animal.

A further object of the present invention is to provide an insect barrier for a horse's leg.

Another object of the present invention is to provide a leg covering for a horse's leg which promotes free air flow.

Yet a further object of the present invention is to provide a leg net for a horse's leg which provides an effective physical barrier against all sizes of insects as well as dirt and debris.

Still another object of the present invention is to provide a leg net that is comfortable and readily accepted by the animal wearing it.

Even yet a further object of the present invention is to provide a leg net for a horse's leg that is easily applied and removed.

Yet still another object of the present invention is to provide a leg net that is inexpensive, durable, easily cleaned and reusable.

As will be discuseed in greater detail in the description of the preferred embodiment as set forth hereinafter, the leg nets in accordance with the present invention are comprised generally of an insect barrier in the form of a generally cylindrical loose fitting body or sleeve of a very light weight nylon or similar synthetic netting which carries upper and lower support cuff and sock portions of a knit material such as a nylon knit similar to that typically used in nylon hosiery.

The leg nets in accordance with the present invention are structured having a synthetic mesh sleeve of a netting that is sufficiently small to keep out all biting insects such as flies, gnats and mosquitoes. The netting is light in weight so that it does not sag and does not feel uncomfortable to the horse. The cylindrical net sleeve body is fashioned in a somewhat bloused or oversized manner so that it stands away from, and does not closely overlie the animal's legs. Thus any insects landing on the body of the leg net cannot come into contact with the surface of the animal's leg.

The horse is protected by the leg nets of the present invention without having to stomp his foot or engage in nervous pacing. Thus, this is a system that does not require active participation of the horse. This results in less hoof and leg problems and keeps the horse calmer. The leg net is securely positioned about the lower leg of the horse by use of the nylon cuff and sock support assemblies. Since the net is closed at both ends by the nylon or other knit material, insects cannot get under the leg nets. This also means that open wounds, cut, abrasions and the like do not need to be closely wrapped and can have sufficient air flow to promote faster healing. The use of a fine mesh cylindrical body for the leg nets also helps keep dirt and debris from touching the wound. The natural electrostatic charge of the material acts as an added barrier to dust which normally also carries a charge.

The knit nylon cuff and sock support portions of the leg net assembly are adequate to keep the device properly positioned without causing excessive pressure or discomfort. The cuff can be placed above the horse's knee or hock joint and does not have to be tightly restrictive to stay up. Since the mesh body portion balloons out, there is provided sufficient fullness so that the horse can freely walk around without excessive pulling pressure on the cuff or sock. The lower sock portion of the leg net can fit snugly about either the fetlock or hoof, as desired.

The leg nets of the present invention are not merely an apparatus for keeping flies off the legs of pampered horses. They are structured to perform a needed function and do so in a manner far superior to prior art devices. By its weight and construction, each leg net is effective in keeping flies and other biting insects off the animal's legs without limiting the horse's movement. It is light enough to not inconvenience the horse yet is stiff enough to keep its shape and stand out away from the animal's leg. It allows free air circulation and is easily cleaned and kept in place. The leg nets in accordance with the present invention are durable, safe, and economical. They satisfy a long standing need for such a device and do so in a highly successful manner.

BRIEF DESCRIPTION OF THE DRAWINGS

While the novel feature of the leg nets assembly of the present invention are set forth with particularity in the appended claims, a full and complete understanding of the invention may be had by referring to the detailed description of the preferred embodiment, as is set forth hereinafter, and as may be seen in the accompanying illustrations in which:

FIG. 1 is a side elevation view of a lower portion of tee front leg of a horse and showing the leg net of the present invention in place; and FIG. 2 is a side elevation of the leg net assembly with the upper cuff and lower sock support portions shown in partial cut away.

DESCRIPTION OF THE PREFERRED EMBODIMENT

Referring initially to FIG. 1 there may be seen generally at 10 a preferred embodiment of a leg net assembly in accordance with the present invention. Leg net assembly 10 is shown in place on the foreleg 12 of a horse. This leg net assembly 10 includes a generally cylindrical sleeve or body portion 14 that, when the leg net assembly 10 is in place about the leg 12 of a horse, generally surrounds a lower portion 16 of leg 12. An upper support cuff 18 is positioned above a knee joint 20 of leg 12. A lower support sock 22 of leg net assembly 10 is placed about the lower leg 16 generally between a hoof 24 and a fetlock 26.

While leg net assembly, generally at 10, is shown in FIG. 1 as being positioned on the lower portion 16 of a foreleg 12 of a horse, it will be understood that leg net 10 is equally suited for use on a rear leg of a horse. In such an application, the upper cuff 18 could be positioned above the rear leg's hock joint. Such placement is not specifically illustrated since the structure and positioning of the leg net assembly 10 are equally applicable to both front and rear legs and the depiction of both such placements is believed unnecessary. Further, while the discussion of the leg net assembly will hereinafter be directed to usage with a horse, it will be understood that the leg net assembly 10 is also intended to be useable with any other similar domestic animal and that the reference to the usage with a horse is to be considered exemplary and not limiting.

Turning now to FIG. 2, the central sleeve or body portion 14 of leg net assembly 10 may be seen as being formed as a net or mesh, such as is shown representatively at 30. Net or mesh 30 is, in the preferred embodiment formed of a very light weight, synthetic netting which is often called "tulle". The mesh size may range from a very fine mesh with less than 1/16 inch mesh, to a small mesh with a ⅛ inch mesh. Larger sizes of mesh would begin to become impractical as they would allow gnats and other small insects to get through the net spaces. Further, larger size meshes would become too heavy and would not stay up as well on the animal's leg. The net or mesh material 30 may be made of nylon or any other suitable synthetic material. It should be relatively stiff so that it will not sag or collapse inwardly and thus will keep its bloused or balloon shape and will stand off away from the lower leg 16. Further, the net or mesh 30 should be able to remain generally stiff after it has been washed or cleaned so that the leg net assembly 10 can be washed or rinsed off and reused. Tulle type netting is flexible, strong, and stiff enough to hold its shape even when stitched or otherwise joined to upper cuff 18 and lower sock 22. The open weave of mesh or net 30 allows free air circulation thereby aiding in wound healing while still excluding various biting insects, as well as dirt and debris.

As may be seen in both FIGS. 1 and 2 the central body portion 14 of leg net 10 is formed in a bloused or balloon shape so that it will stand away from the leg portion 16 of the horse. Since the material used to form body 10 is, as was discussed above, somewhat stiff, this bloused shape remains during usage of leg nets 10. Flies and other biting insects which land on body portion 14 cannot bite through the netting and do not come into contact with the horse's leg 16. The bloused or balloon shape also provides fullness around the leg thereby allowing free leg movement and bending within the net or mesh. The shape also permits free air circulation and since the mesh or net 30 does not lie against the leg 16, it will not cause the horse to sweat.

Again turning to FIG. 2, a support system for the central body 14 is provided by an upper support cuff 18 and a lower support sock 22 which are, in the preferred embodiment, both formed as a nylon knit as is typically used in nylon hosiery. A knit material of this general type has high stretch properties but is not overly restrictive as would be the case if highly elasticized materials or straps were to be used. The top or cuff support member 18 is formed having multiple layers 40 and 42 of nylon knit or a similar material. This upper cuff 18 fits snugly about the horse's leg 12. When placed above the knee or hock joint 20, the protrusion of the joint is adequate to retain the upper cuff 18 in place. The lower or sock support member 22 is also formed of a nylon knit or similar material. Since its purpose is to hold the lower portion of the mesh body 14 down, it need be formed of only a single layer 50. This lower sock 22 will fit snugly around the hoof 24, or fetlock 26, as desired.

The knit upper cuff 18 and lower sock 22 are joined to the central mesh body 14 by any means of securement such as with an overlock stitch, as illustrated somewhat schematically at 60 and 62 at the junctures of upper cuff 18 and lower sock 22 with the ends of the body 14 of leg net assembly 10. Other suitable securement or junction forming means could also be employed so long as they provide a secure, dependable attachment between the cuff 18, the sock 22 and the mesh body 14.

The leg net assembly 10 is very easy to care for and is also long lasting. Both the tulle material used for the body 14 and the nylon or similar knit support material used for the cuff 18 and the sock 22 can be quickly and easily cleaned by being hosed down in the stable, or by being hand washed and air dried. These materials have quick drying properties. The knit cuff and sock provide adequate support yet are comfortable to the horse so that the animal will tolerate them well and will wear them all day. They are easy to put on and take off and retain their stretch through repeated uses. Since the cuff 18 and sock 22 do closely engage the horse's leg, they will not let insects through. The bloused shape of the central body portion 14 insures the separation of biting insects which might light on it from the legs of the animal. In combination, the supporting cuff and sock end portions in conjunction with the central body portion form a leg net assembly which is easy to use, durable, inexpensive and which is very effective in keeping insects away from the lower legs of horses.

While a leg net assembly in accordance with the present invention has been set forth fully and completely hereinabove, it will be apparent to one of skill in the art that various changes in the leg net could be made without departing from the true spirit and scope of the invention which is accordingly to be limited only by the following claims.

What is claimed is:

1. A leg net assembly positionable about the leg portion of an animal to prevent insects from contacting the leg, said leg net assembly comprising:
   a central, generally cylindrical, loose fitting body portion, said central body portion being formed of a tulle type relatively stiff, light weight synthetic mesh material having a fine mesh size generally between about 1/16 and ⅛ inch, said fine mesh cylindrical body portion further being bloused to have sufficient fullness and being caused by said blousing and by said relative stiffness of said material to stand away from the leg of the animal to thereby prevent insects which may land on said central loose fitting body portion from being able to contact the leg of the animal while allowing free air circulation and movement and bending of the leg within said body portion; and
   upper and lower supports, said upper and lower supports each being formed of a knit, high stretch material and being attached to upper and lower ends, respectively of said central generally cylindrical body, said supports being snugly positionable about the leg of the animal to secure said leg net assembly to the leg of the animal, said upper support being a multiple layer knit cuff which is positionable about an upper leg portion of the animal in a non-restrictive manner while providing sufficient support to retain said upper end of said central mesh body portion about the upper portion of the leg of the animal while providing a high level of comfort to the animal, said lower support being a single layer knit sock which is positionable about a lower leg portion of the animal in a non-restrictive manner to hold said lower end of said central mesh body down about the lower leg portion of the animal.

* * * * *